(12) United States Patent
Newman et al.

(10) Patent No.: US 10,017,977 B2
(45) Date of Patent: *Jul. 10, 2018

(54) KEYLESS ENTRY ASSEMBLY HAVING CAPACITANCE SENSOR OPERATIVE FOR DETECTING OBJECTS

(75) Inventors: Todd R. Newman, Traverse City, MI (US); John M. Washeleski, Cadillac, MI (US)

(73) Assignee: UUSI, LLC, Reed City, MI (US)

( * ) Notice: Subject to any disclaimer, the term of this patent is extended or adjusted under 35 U.S.C. 154(b) by 168 days.

This patent is subject to a terminal disclaimer.

(21) Appl. No.: 12/784,010

(22) Filed: May 20, 2010

(65) Prior Publication Data

US 2011/0043325 A1 Feb. 24, 2011

Related U.S. Application Data

(63) Continuation-in-part of application No. 12/545,178, filed on Aug. 21, 2009.

(51) Int. Cl.
| | |
|---|---|
| *E05F 15/00* | (2015.01) |
| *E05F 15/46* | (2015.01) |
| *E05F 15/73* | (2015.01) |
| *B60R 25/20* | (2013.01) |
| *E05F 15/616* | (2015.01) |

(52) U.S. Cl.
CPC .......... *E05F 15/46* (2015.01); *B60R 25/2045* (2013.01); *E05F 15/73* (2015.01);
(Continued)

(58) Field of Classification Search
USPC ........................................................ 340/5.72
See application file for complete search history.

(56) References Cited

U.S. PATENT DOCUMENTS

| 2,476,111 A | 7/1949 | Opalek |
| 3,830,018 A | 8/1974 | Arai et al. |
| | (Continued) | |

FOREIGN PATENT DOCUMENTS

| CN | 201158356 Y | 12/2008 |
| DE | 10 2006 009 998 A1 | 9/2007 |
| | (Continued) | |

OTHER PUBLICATIONS

International Preliminary Examining Authority, International Preliminary Report on Patentability for the corresponding PCT Application No. PCT/US2010/45729 dated Jan. 20, 2012.
(Continued)

*Primary Examiner* — Brian Zimmerman
*Assistant Examiner* — Cal Eustaquio
(74) *Attorney, Agent, or Firm* — Howard & Howard Attorneys PLLC (57) ABSTRACT

A keyless entry assembly includes a vehicle opening movable between locked and unlocked positions, an electrical conductor (i.e., a capacitance sensor) mounted to the vehicle opening, and a controller. The conductor capacitively couples to an electrically conductive object proximal to (or touching) the conductor while the conductor is driven with an electrical charge such that capacitance of the conductor changes due to the conductor capacitively coupling with the object. The conductor is in the shape of an emblem identifying a vehicle associated with the vehicle opening. The controller is operable for driving the conductor with the electrical charge and measuring the capacitance of the conductor to determine whether an electrically conductive object is proximal to the conductor. The controller is further operable for controlling the vehicle opening to move the vehicle opening between the positions upon determining that the object is proximal to (or touching) the conductor.

23 Claims, 5 Drawing Sheets

(52) U.S. Cl.
CPC ............. *E05F 15/00* (2013.01); *E05F 15/616* (2015.01); *E05Y 2400/852* (2013.01); *E05Y 2400/86* (2013.01); *E05Y 2600/46* (2013.01); *E05Y 2900/531* (2013.01); *E05Y 2900/546* (2013.01); *E05Y 2900/548* (2013.01)

(56) References Cited

U.S. PATENT DOCUMENTS

| | | |
|---|---|---|
| 3,855,733 A | 12/1974 | Miller |
| 4,178,621 A | 12/1979 | Simonelic et al. |
| 4,410,843 A | 10/1983 | Sauer |
| 4,422,521 A | 12/1983 | Mochida |
| 4,933,807 A | 6/1990 | Duncan |
| 5,361,018 A | 11/1994 | Milton et al. |
| 5,394,292 A | 2/1995 | Hayashida |
| 5,493,277 A | 2/1996 | Pierce et al. |
| 5,621,290 A | 4/1997 | Heller et al. |
| 5,730,165 A | 3/1998 | Philipp |
| 5,801,340 A | 9/1998 | Peter |
| 5,952,801 A | 9/1999 | Boisvert et al. |
| 5,959,538 A | 9/1999 | Schousek |
| 6,185,872 B1 | 2/2001 | Seeberger et al. |
| 6,188,228 B1 | 2/2001 | Philipp |
| 6,233,872 B1 | 5/2001 | Glagow et al. |
| 6,337,549 B1 | 1/2002 | Bledin |
| 6,340,199 B1 | 1/2002 | Fukumoto et al. |
| 6,377,009 B1 | 4/2002 | Philipp |
| 6,389,752 B1 | 5/2002 | Rosenau |
| 6,404,158 B1 | 6/2002 | Boisvert et al. |
| 6,431,638 B1 | 8/2002 | Mrozowski et al. |
| 6,498,214 B2 | 12/2002 | Laughner et al. |
| 6,499,359 B1 | 12/2002 | Washeleski et al. |
| 6,555,982 B2 | 4/2003 | Tyckowski |
| 6,700,393 B2 | 3/2004 | Haag et al. |
| 6,723,933 B2 | 4/2004 | Haag et al. |
| 6,782,759 B2 | 8/2004 | Shank et al. |
| 6,879,250 B2 | 4/2005 | Fayt et al. |
| 6,933,831 B2 | 8/2005 | Ieda et al. |
| 6,936,986 B2 | 8/2005 | Nuber |
| 6,946,853 B2 | 9/2005 | Gifford et al. |
| 6,968,746 B2 | 11/2005 | Shank et al. |
| 6,980,095 B2 | 12/2005 | Wright et al. |
| 7,015,666 B2 | 3/2006 | Staus |
| 7,038,414 B2 | 5/2006 | Daniels et al. |
| 7,055,885 B2 | 6/2006 | Ishihara et al. |
| 7,084,859 B1 | 8/2006 | Pryor |
| 7,116,117 B2 | 10/2006 | Nakano et al. |
| 7,126,453 B2 | 10/2006 | Sandau et al. |
| 7,132,642 B2 | 11/2006 | Shank et al. |
| 7,152,907 B2 | 12/2006 | Salhoff et al. |
| 7,162,928 B2 | 1/2007 | Shank et al. |
| 7,219,945 B1 | 5/2007 | Zinn et al. |
| 7,248,151 B2 | 7/2007 | McCall |
| 7,255,466 B2 | 8/2007 | Schmidt et al. |
| 7,260,454 B2 | 8/2007 | Pickering et al. |
| 7,293,467 B2 | 11/2007 | Shank et al. |
| 7,312,591 B2 | 12/2007 | Washeleski et al. |
| 7,333,090 B2 | 2/2008 | Tanaka et al. |
| 7,342,373 B2 | 3/2008 | Newman et al. |
| 7,354,097 B2 | 4/2008 | Jackson et al. |
| 7,375,299 B1 | 5/2008 | Pudney |
| 7,424,347 B2 | 9/2008 | Babala et al. |
| 7,424,377 B2 | 9/2008 | Hamilton et al. |
| 7,449,852 B2 | 11/2008 | Washeleski et al. |
| 7,513,166 B2 | 4/2009 | Shank et al. |
| 7,518,327 B2 | 4/2009 | Newman et al. |
| 7,525,062 B2 | 4/2009 | Adam et al. |
| 7,538,672 B2 | 5/2009 | Lockyer et al. |
| 7,547,058 B2 | 6/2009 | King et al. |
| 7,548,809 B2 | 6/2009 | Westerhoff |
| 7,576,631 B1 | 8/2009 | Bingle et al. |
| 7,706,046 B2 | 4/2010 | Bauer et al. |
| 7,710,245 B2 | 5/2010 | Pickering |
| 7,733,332 B2 | 6/2010 | Steenwyk et al. |
| 7,812,721 B2 | 10/2010 | Hoshina et al. |
| 7,893,831 B2 | 2/2011 | Hoshina et al. |
| 7,976,749 B2 | 7/2011 | Volkel et al. |
| 7,989,725 B2 | 8/2011 | Boddie et al. |
| 8,033,052 B2 | 10/2011 | Kraus et al. |
| 8,154,418 B2 | 4/2012 | Peterson et al. |
| 8,321,174 B1 | 11/2012 | Moyal et al. |
| 8,589,033 B2 | 11/2013 | Rafii et al. |
| 8,635,809 B2 | 1/2014 | Wuerstlein et al. |
| 8,874,324 B2 | 10/2014 | Eggers et al. |
| 9,051,769 B2 | 6/2015 | Washeleski et al. |
| 9,199,608 B2 | 12/2015 | Newman et al. |
| 2001/0026244 A1 | 10/2001 | Ieda et al. |
| 2001/0052839 A1* | 12/2001 | Nahata et al. ............... 340/5.72 |
| 2002/0125994 A1 | 9/2002 | Sandau et al. |
| 2003/0071727 A1* | 4/2003 | Haag ................... H03K 17/955 340/562 |
| 2003/0216817 A1* | 11/2003 | Pudney ........................ 700/17 |
| 2004/0124662 A1 | 7/2004 | Cleland et al. |
| 2004/0140045 A1 | 7/2004 | Burgess et al. |
| 2004/0233677 A1* | 11/2004 | Su et al. ....................... 362/501 |
| 2005/0073852 A1 | 4/2005 | Ward |
| 2005/0090946 A1 | 4/2005 | Pickering et al. |
| 2005/0092097 A1 | 5/2005 | Shank et al. |
| 2005/0187689 A1 | 8/2005 | Westerhoff |
| 2005/0270620 A1 | 12/2005 | Bauer et al. |
| 2006/0026521 A1 | 2/2006 | Hotelling et al. |
| 2006/0145825 A1 | 7/2006 | McCall |
| 2006/0177212 A1 | 8/2006 | Lamborghini et al. |
| 2006/0238385 A1 | 10/2006 | Steenwyk et al. |
| 2007/0089527 A1 | 4/2007 | Shank et al. |
| 2007/0096904 A1 | 5/2007 | Lockyer et al. |
| 2007/0152615 A1 | 7/2007 | Newman et al. |
| 2007/0171057 A1 | 7/2007 | Ogino et al. |
| 2007/0195542 A1 | 8/2007 | Metros et al. |
| 2007/0276550 A1 | 11/2007 | Desai et al. |
| 2007/0296242 A1 | 12/2007 | Frommer et al. |
| 2008/0024451 A1 | 1/2008 | Aimi et al. |
| 2008/0142593 A1 | 6/2008 | Walsh et al. |
| 2008/0202912 A1 | 8/2008 | Boddie et al. |
| 2009/0000196 A1 | 1/2009 | Kollar et al. |
| 2009/0044449 A1 | 2/2009 | Appel |
| 2009/0219134 A1* | 9/2009 | Nakasato et al. ............ 340/5.72 |
| 2009/0243824 A1 | 10/2009 | Peterson et al. |
| 2010/0024301 A1 | 2/2010 | Wuerstlein et al. |
| 2010/0079387 A1 | 4/2010 | Rosenblatt et al. |
| 2010/0096193 A1 | 4/2010 | Yilmaz et al. |
| 2010/0097469 A1 | 4/2010 | Blank et al. |
| 2010/0219935 A1 | 9/2010 | Bingle et al. |
| 2010/0287837 A1 | 11/2010 | Wuerstlein et al. |
| 2011/0001550 A1 | 1/2011 | Schoen |
| 2011/0041409 A1 | 2/2011 | Newman et al. |
| 2011/0043325 A1 | 2/2011 | Newman et al. |
| 2011/0057773 A1 | 3/2011 | Newman et al. |
| 2011/0187492 A1 | 8/2011 | Newman et al. |
| 2011/0313619 A1 | 12/2011 | Washeleski et al. |
| 2011/0316304 A1 | 12/2011 | Schwaiger et al. |
| 2012/0182141 A1 | 7/2012 | Peterson et al. |
| 2012/0192489 A1 | 8/2012 | Pribisic |
| 2012/0219935 A1 | 8/2012 | Stebbings et al. |
| 2015/0267453 A1 | 9/2015 | Matsumoto et al. |

FOREIGN PATENT DOCUMENTS

| | | |
|---|---|---|
| EP | 1 247 696 A1 | 10/2002 |
| EP | 1 991 751 A1 | 11/2008 |
| WO | 8908952 A1 | 9/1989 |
| WO | 0212669 | 2/2002 |
| WO | 03038220 | 5/2003 |
| WO | WO 2007/096746 A1 | 9/2007 |

OTHER PUBLICATIONS

International Searching Authority, International Search Report and the Written Opinion for the corresponding PCT/US2010/045729 dated Oct. 6, 2010.

International Preliminary Report on Patentability for International Application No. PCT/US11/58523 dated Feb. 1, 2013.

(56) References Cited

OTHER PUBLICATIONS

Non-Final Office Action dated Jun. 17, 2016 for Utility U.S. Appl. No. 13/221,167.
English language abstract and machine-assisted English translation for CN 201158356 extracted from espacenet.com database on May 12, 2016, 8 pages.
Machine-assisted English language abstract for DE 10 2006 009 998 extracted from espacenet.corn database on May 12, 2016, 3 pages (see also English language equivalent U.S. 2009/0044449 previously submitted on Apr. 22, 2016).
English language abstract for EP 1 247 696 extracted from espacenet.com database on May 12, 2016, 1 page.
English language abstract not found for EP 1 991 751; however, see U.S. 2009/0044449—English language equivalent of corresponding WO 2007/098746. U.S. 2009/0044449 was previously submitted on Apr. 22, 2016.
English language abstract for WO 2007/098746 extracted from espacenet.com database on May 12, 2016, 1 page.
Notice of Allowance and Fees Due dated Mar. 24, 2017 for Utility U.S. Appl. No. 12/545,178.
Non-Final Office Action dated Aug. 9, 2016 for Utility U.S. Appl. No. 14/730,420.
Final Office Action dated Sep. 22, 2016 for Utility U.S. Appl. No. 12/545,178.
Notice of Allowance and Fees Due dated Oct. 27, 2016 for Utility U.S. Appl. No. 13/084,611.
Final Office Action dated Nov. 29, 2016 for Utility U.S. Appl. No. 14/730,420.
Final Office Action dated Nov. 30, 2016 for Utility U.S. Appl. No. 13/221,167.

\* cited by examiner

KEYLESS ENTRY ASSEMBLY HAVING CAPACITANCE SENSOR OPERATIVE FOR DETECTING OBJECTS

CROSS-REFERENCE TO RELATED APPLICATIONS

This application is a continuation-in-part of U.S. application Ser. No. 12/545,178, filed Aug. 21, 2009; the disclosure of which is hereby incorporated by reference.

U.S. Pat. Nos. 7,513,166 and 7,342,373 are also hereby incorporated by reference.

BACKGROUND OF THE INVENTION

1. Field of the Invention

The present invention relates to keyless entry assemblies for vehicles.

SUMMARY OF THE INVENTION

An object of the present invention is a keyless entry assembly having a capacitance sensor and a controller in which the sensor detects an object in proximity with or touching a vehicle opening such as a door, trunk, hatch, or the like and the controller controls the vehicle opening based on detection of the object.

Another object of the present invention is a keyless entry assembly having a capacitance sensor and a controller in which the sensor detects an object in proximity with or touching a vehicle opening, the sensor is in the form of an emblem or the like indicative of a vehicle, and the controller controls the vehicle opening based on detection of the object.

A further object of the present invention is a keyless entry assembly having a capacitance sensor and a controller in which the sensor detects a user in proximity with or touching a vehicle opening and the controller controls the vehicle opening based on detection of the user and detection of an authorized key fob in possession by the user.

In carrying out the above objects and other objects, the present invention provides a keyless entry assembly having a vehicle opening movable between a locked position and an unlocked position, an electrical conductor (i.e., a capacitance sensor) mounted to an exterior surface of the vehicle opening, and a controller. The conductor capacitively couples to an electrically conductive object proximal to the conductor while the conductor is driven with an electrical charge such that capacitance of the conductor changes due to the conductor capacitively coupling with the object. The conductor is in the shape of an emblem identifying a vehicle to be associated with the vehicle opening. The controller is operable for driving the conductor with the electrical charge and measuring the capacitance of the conductor to determine whether an electrically conductive object is proximal to the conductor. The controller is further operable for controlling the vehicle opening to move the vehicle opening from one of the positions to the other of the positions upon determining that an electrically conductive object is proximal to the conductor.

Further, in carrying out the above objects and other objects, the present invention provides a keyless entry assembly having an electrical conductor (i.e., a capacitance sensor) and a controller. The conductor is mountable to an exterior surface of a vehicle opening movable between a locked position and an unlocked position. The conductor capacitively couples to an electrically conductive object proximal to the conductor while the conductor is driven with an electrical charge such that capacitance of the conductor changes due to the conductor capacitively coupling with the object. The conductor is in the shape of an emblem identifying a vehicle to be associated with the vehicle opening. The controller is operable for driving the conductor with the electrical charge and measuring the capacitance of the conductor to determine whether an electrically conductive object is proximal to the conductor. The controller is further operable for controlling the vehicle opening to move the vehicle opening from one of the positions to the other of the positions upon determining that an electrically conductive object is proximal to the conductor.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1A:
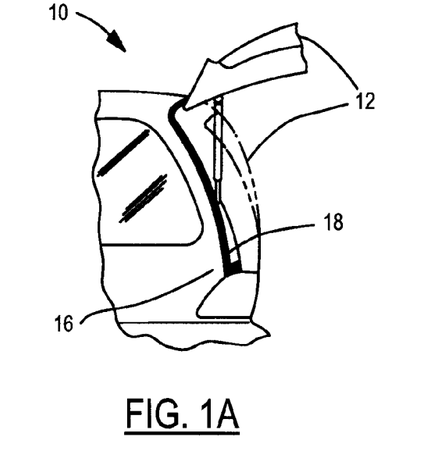
FIG. 1A illustrates a side view of a vehicle lift gate assembly having a lift gate.
Figure 1B:
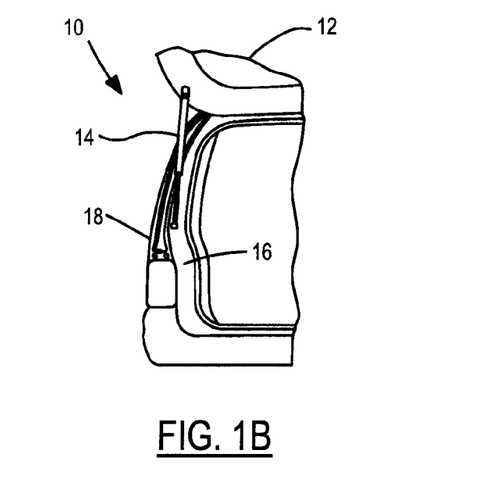
FIG. 1B illustrates a rear view of the vehicle lift gate assembly shown in FIG. 1A.

Referring now to FIGS. 1A and 1B, a vehicle lift gate assembly 10 having a lift gate 12 is shown. Lift gate 12 is connected by a cylinder 14 or the like to a body panel 16 of a vehicle. Cylinder 14 includes a piston rod which extends to move lift gate 12 to an opened position with respect to body panel 16 and contracts to move lift gate 12 to a closed position with respect to body panel 16 (lift gate 12 in the closed position is shown as a dotted line in FIG. 1A). A capacitance sensor 18 is mounted along body panel 16.

Sensor 18 is operable for detecting the presence of an electrically conductive object such as a human body part extending into the opening between lift gate 12 and body panel 16 when the object is proximal to body panel 16.

Sensor 18 is part of an anti-entrapment system which includes a controller. Sensor 18 generally includes separated first and second electrically conductive conductors with a dielectric element therebetween. The conductors are set at different voltage potentials with respect to one another with one of the conductors typically being set at electrical ground. Sensor 18 has an associated capacitance which is a function of the different voltage potentials applied to the conductors. The capacitance of sensor 18 changes in response to the conductors being physically moved relative to one another such as when an object (either electrically conductive or non-conductive) touches sensor 18. Similarly, the capacitance of sensor 18 changes when an electrically conductive object comes into proximity with the conductor of sensor 18 that is not electrically grounded. As such, sensor 18 is operable to detect an object on sensor 18 (i.e., an object touching sensor 18) and/or the presence of an object near sensor 18 (i.e., an object in proximity to sensor 18).

The controller is in communication with sensor 18 to monitor the capacitance of sensor 18. When the capacitance of sensor 18 indicates that an object is near or is touching sensor 18 (i.e., an object is near or is touching vehicle body panel 16 to which sensor 18 is mounted), the controller controls lift gate 12 accordingly via cylinder 14. For instance, the controller controls lift gate 12 to halt movement in the closing direction when sensor 18 detects the presence of an object near sensor 18. In this case, the object may be a human such as a child and the controller halts the closing movement of lift gate 12 to prevent lift gate 12 from closing on the child. In this event, the controller may further control lift gate 12 to cause lift gate 12 to move in the opening direction in order to provide the child with room to move between the vehicle and lift gate 12 if needed. Instead of being mounted on body panel 16 as shown in FIGS. 1A and 1B, sensor 18 can be mounted on a closing member such as lift gate 12 or on any other closure opening where anti-trap is required. That is, sensor 18 can be located on body panel 16 or on a closing member like lift gate 12 or on any closure opening where an anti-trap is desired or required.

Figure 2:
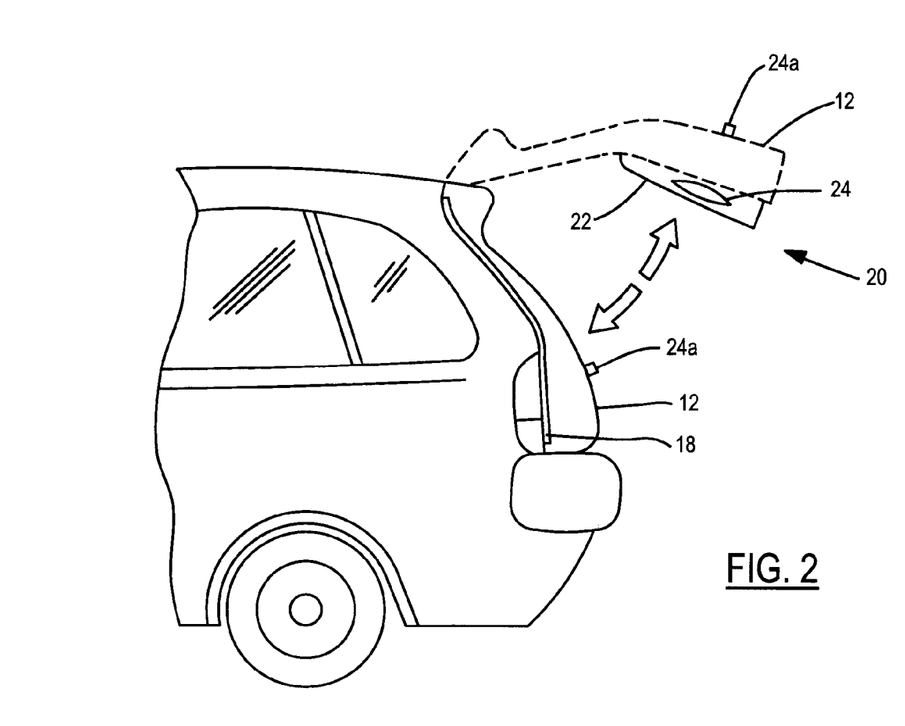
FIG. 2 illustrates a side view of a vehicle lift gate assembly having a lift gate and a fascia panel thereon with the fascia panel having a capacitance sensor in accordance with an embodiment of the present invention.

Referring now to FIG. 2, with continual reference to FIGS. 1A and 1B, a side view of a vehicle lift gate assembly 20 in accordance with an embodiment of the present invention is shown. Lift gate assembly 20 includes lift gate 12 which is movable between opened and closed positions with respect to vehicle body panel 16. Lift gate assembly 20 includes sensor 18 which is mounted along body panel 16 and is operable for detecting the presence of an electrically conductive object extending into the opening between lift gate 12 and body panel 16 when the object is touching or is proximal to sensor 18.

Lift gate assembly 20 differs from lift gate assembly 10 shown in FIGS. 1A and 1B in that lift gate 12 of lift gate assembly 20 includes an interior fascia panel 22 having a capacitance sensor 24. Fascia panel 22 is mounted to the interior surface of lift gate 12. Sensor 24 is mounted to the interior surface of fascia panel 22 which faces the vehicle interior when lift gate 12 is closed. As such, sensor 24 is between fascia panel 22 and lift gate 12. Alternatively, sensor 24 may be within fascia panel 22 or mounted to an exterior surface of fascia panel 22. That is, sensor 24 can be mounted internal to fascia panel 22 or on the exterior of fascia panel 22.

Like sensor 18, sensor 24 is part of an anti-entrapment system which includes a controller and is operable for detecting the presence of an electrically conductive object such as a human body part in proximity to sensor 24. Sensor 24 includes an electrically conductive conductor like the first conductor of sensor 18, but does not include another conductor like the second conductor of sensor 18. In general, the conductor of sensor 24 (i.e., sensor 24 itself) capacitively couples to an electrically conductive object which is in either proximity to or is touching sensor 24 while sensor 24 is driven with an electrical charge. The controller is in communication with sensor 24 to monitor the capacitive coupling of sensor 24 to the object. The controller determines that an object is in proximity to or is touching sensor 24 (when sensor 24 is exposed to contact) upon detecting the capacitive coupling of sensor 24 to the object. In turn, the controller controls lift gate 12 accordingly.

As sensor 24 is mounted to fascia panel 22 which is mounted to lift gate 12, sensor 24 is operable for detecting the presence of an electrically conductive object extending into the opening between lift gate 12 and the vehicle body when the object is proximal to fascia panel 22 (as opposed to when the object is proximal to vehicle body panel 16 as provided by sensor 18). As such, sensor 24 expands the anti-entrapment capability compared to that of lift gate assembly 10 for detecting the presence of an object in the travel path of lift gate 12. An example is that sensor 24, which is located within fascia panel 22, can detect the presence of a person standing under an open lift gate 12 to thereby prevent fascia panel 22 (and thereby lift gate 12) from contacting the person as lift gate 12 is closing. To this end, when detection occurs, the controller halts downward travel and reverses movement of lift gate 12 back to the opened position. If desired, sensor 24 and the controller can be configured to monitor for a person in close proximity to lift gate 12 to prevent lift gate 12 from opening. For example, this detection prevents a person such as a child from accidentally falling out of the vehicle when lift gate 12 is partially opened. An alternative location for sensor 24 can be along each outer edge of lift gate opening.

Figure 3A:
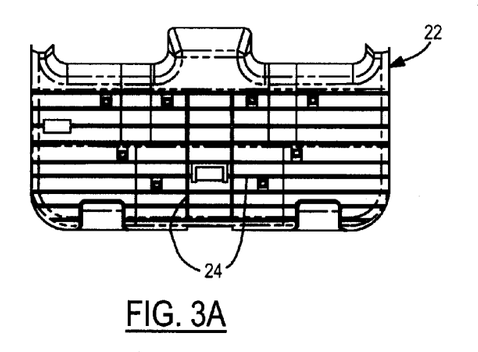
FIG. 3A illustrates an interior view of the fascia panel and the sensor of the vehicle lift gate assembly shown in FIG. 2.
Figure 3B:
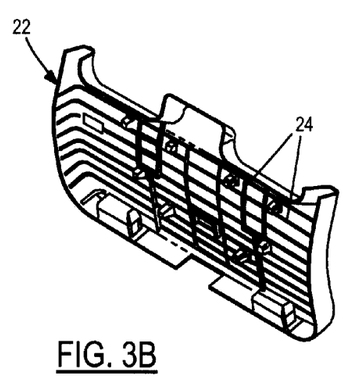
FIG. 3B illustrates an angled interior view of the fascia panel and the sensor of the vehicle lift gate assembly shown in FIG. 2.

Referring now to FIGS. 3A and 3B, with continual reference to FIG. 2, interior views of fascia panel 22 and sensor 24 of vehicle lift gate assembly 20 are shown. As indicated above, sensor 24 is placed on the interior surface of fascia panel 22 which faces the vehicle interior when lift gate 12 is closed. That is, sensor 24 is placed on the interior surface of fascia panel 22 which is farthest from lift gate 12. FIGS. 3A and 3B illustrate this interior surface of fascia panel 22.

As shown in FIGS. 3A and 3B, sensor 24 is formed from an array of electrically conductive strips which are placed vertically and horizontally across the interior surface of fascia panel 22. The strips of sensor 24 are in electrical connectivity to each other and together form the conductor of sensor 24 (i.e., the strips together are sensor 24). The strips of sensor 24 extend across this interior surface of fascia panel 22 following the contour of fascia panel 22. In this embodiment, fascia panel 22 is made of non-conductive plastic material which allows sensor 24 to detect the presence of conductive objects through fascia panel 22.

Sensor 24 can be placed on the external surface of fascia panel 22 which directly faces the vehicle interior when lift gate 12 is closed. However, placement of sensor 24 on the interior surface of fascia panel 24 hides sensor 24 from user view and protects sensor 24 against potential damage. Sensor 24 can also be over-molded on any surface of fascia panel 22 allowing for additional protection from damage caused by assembly or other handling.

The strips of sensor 24 can be configured into other array patterns utilizing angle or curvature combinations that may better optimize object detection objectives. Sensor 24 can be tailored and applied in any deliberate pattern to customize and enhance object detection performance. The distance between each strip is sufficient to provide continuous object detection coverage across the surface of fascia panel 22. Other configurations in place of the strips of sensor 24 include a solid sheet of electrically conductive material such as copper or aluminum foil, a conductive array or screen that is stamped, woven, or braided, multiple conductive decal-like shapes placed about the interior surface of fascia panel 22 and electrically interconnected, etc. The strips of sensor 24 are fabricated from copper, but may be fabricated from other materials including carbon inks, fabrics, plastics, elastomers, or other metals like aluminum, brass, bronze, and the like. There are various known methods to achieve electrical conductivity in fabrics, plastics, and elastomers. The conductive material can be deposited onto the plastic or deposited into a carrier which is then inserted into the mold to form sensor 24.

As indicated above, the strips of sensor 24, which are electrically interconnected to one another, form a conductor which functions like a first conductive plate of a capacitor. Such a capacitor has a second conductive plate with the plates being separated from one another by a material such as a dielectric element. Unlike such a capacitor, sensor 24 is constructed without a second conductive plate and without a second conductive plate electrically connected to ground. Instead, the metal construction of lift gate 12 functions as the second conductive plate and provides shielding of sensor 24 from stray capacitive influence.

Alternatively, sensor 24 can be constructed to use multiple layers of conductors, each separated by a non-conductive material. A ground layer of conductive material placed behind the other layers can be used to provide extra shielding as necessary.

Fascia panel 22 made of a rigid material restricts sensor 24 from detecting electrically non-conductive objects. This is because the rigidness of fascia panel 22 prevents fascia panel 22 from displacing when an object touches fascia panel 22. In turn, sensor 24 is prevented from displacing toward the metal construction of lift gate 12 when the object touches fascia panel 22. As such, any change of the capacitance between sensor 24 and lift gate 12 does not occur as a result of an electrically non-conductive object touching fascia panel 22. For both electrically conductive and non-conductive object modes of detection, sensor 24 may be mounted to the external surface of fascia panel 22. In this case, an object (electrically conductive or non-conductive) touching sensor 24 triggers sensor 24 (i.e., causes a change in capacitance between sensor 24 and the metal construction of lift gate 12) due to sensor 24 compressing (i.e., sensor 24 displacing towards lift gate 12). Likewise, sensor 24 mounted to the internal surface of fascia panel 22 can detect an object touching fascia panel 22 when fascia panel 22 is flexible and/or compressible to the degree required to allow sensor 24 to displace towards lift gate 12.

Figures 4A, 4B:
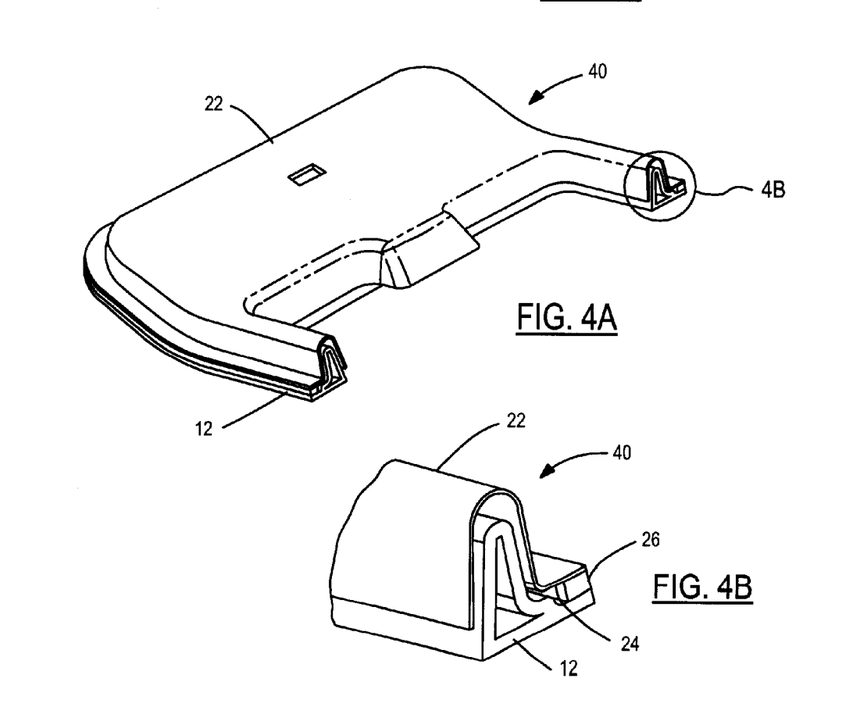
FIG. 4A illustrates a perspective view of a vehicle lift gate assembly having a lift gate and a fascia panel thereon with the fascia panel having a capacitance sensor in accordance with an embodiment of the present invention.
FIG. 4B illustrates the cross-section "4B" of FIG. 4A where the sensor is configured for both electrically conductive and non-conductive object detection.

Referring now to FIGS. 4A and 4B, a vehicle lift gate assembly 40 in accordance with an embodiment of the present invention is shown. Lift gate assembly 40 is similar to lift gate assembly 20 in that lift gate assembly 40 includes a lift gate 12 and a fascia panel 22 thereon with fascia panel 22 having sensor 24. Lift gate assembly 40 is configured differently than lift gate assembly 20 in that a portion of fascia panel 22 of lift gate assembly 40 is configured to enable sensor 24 to perform both electrically conductive and non-conductive object detection near this portion of fascia panel 22. Sensor 24 as shown in FIG. 4B can be separate from the trim panel.

To this end, an element (e.g., a strip) of sensor 24 is positioned on the interior surface of an edge region of fascia panel 22 adjacently along an edge of lift gate 12 and is separated from lift gate 12 by a spacer 26. Spacer 26 is constructed of an electrically non-conductive material and is compressible. As described above, the metal construction of lift gate 12 provides the electrical ground used to shield sensor 24 from stray capacitive influence. This configuration is an example of extending fascia panel 22 to the extreme edges of lift gate 12 to sense the presence of an object in the travel path of lift gate 12 when lift gate 12 closes. Spacer 26 made of a compressible material such as open or closed cell foam rubber or other like materials allows the edge region of sensor 24 (and the edge region of fascia panel 22) to move spatially closer to the metal ground of lift gate 12 upon an object touching the edge region of fascia panel 22. Spacer 26 can be continuous or comprised of smaller sections arranged along the area to be sensed which allows movement of the edge regions of fascia panel 22 and sensor 24 when pressure is applied.

Sensor 24 can detect electrically conductive objects which are in proximity to or touching the edge region of sensor 24 and can detect electrically non-conductive objects which are touching the edge region of sensor 24. In particular, sensor 24 can detect an electrically conductive object proximal to the edge region of sensor 24 due to the capacitive coupling of the edge region of sensor 24 with the object. Sensor 24 can detect an object (electrically conductive or non-conductive) touching the edge region of fascia panel due to the capacitance of sensor 24 with the metal construction of lift gate 12 changing as a result of the edge region of sensor 24 being displaced from the touch in the direction of lift gate 12. Spacer 26 compresses to allow the edge region of sensor 24 to displace towards lift gate 12.

Applications of sensor 24 are not limited to fascia panel 22 of lift gate assemblies 20, 40. Likewise, in addition to detecting the presence of an object for anti-entrapment purposes, sensor 24 can be positioned behind any electrically non-conductive surface and be configured to detect the presence, position, or motion (e.g., gesture) of an electrically conductive object such as a human. Sensor 24 and its controller can serve as an interface between a human user and a vehicle to enable the user to control various vehicle functions requiring human input. The controller can be configured to have sensitivity to detect the position of a person's finger in proximity to sensor 24 prior to carrying out an actual key press or other type of user activation. For example, it may be desired to initiate a sequence of operations by positioning a finger or hand in proximity to a series of sensors 24 ("touch pads") followed by a specific activation command once a sought out function has been located. The initial finger positioning can be to illuminate keypads or the like associated with the series of sensors 24 to a first intensity without activation of a command. As the touch area expands from increased finger pressure, the signal increases thereby allowing the controller to distinguish between positioning and activation command functions. Confirmation of the selection, other than activation of the desired function, can be configured to increase illumination intensity, audible feedback, or tactile feedback such as vibration. Each sensor 24 ("touch area") can have a different audio and feel to differentiate the touch area operation.

Figure 5:
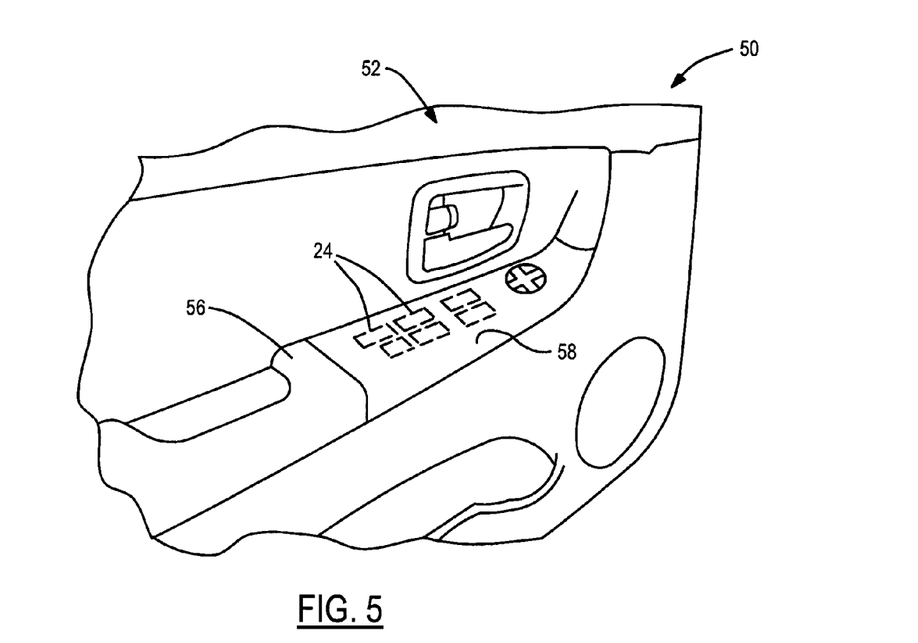
FIG. 5 illustrates a perspective view of a vehicle door assembly having an interior door fascia and capacitance sensors in accordance with an embodiment of the present invention.
Figure 6:
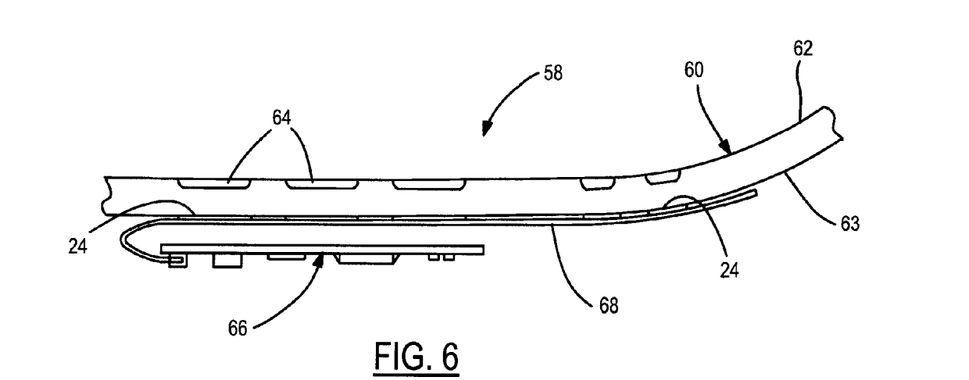
FIG. 6 illustrates a cross-sectional view of the arrangement of the sensors of the vehicle door assembly shown in FIG. 5.

Referring now to FIGS. 5 and 6, a vehicle door assembly 50 in accordance with an embodiment of the present invention will be described. Vehicle door assembly 50 represents an application of sensor 24 to an environment other than vehicle lift gate assemblies. Assembly 50 includes an interior door fascia 52 and a series of sensors 24. FIG. 5 illustrates a perspective view of vehicle door assembly 50 and FIG. 6 illustrates a cross-sectional view of the arrangement of sensors 24.

Sensors 24 of vehicle door assembly 50 are each formed by their own conductor and are not directly electrically connected to one another. As such, each sensor 24 defines a unique touch pad associated with a unique touch area in which object detection of one sensor 24 does not depend on object detection of another sensor 24. Sensors 24 are arranged into an array and function independently of one another like an array of mechanical switches that commonly control vehicle functions like window up and down travel, door locking and unlocking, positioning of side view mirrors, etc.

Interior door fascia 52 includes a pull handle 56 and a faceplate assembly 58 which together create an armrest component of door fascia 52. Sensors 24 are individually attached to the underside of faceplate assembly 58. Each sensor 24 has a sufficient area to detect a human finger proximal to that sensor. Object detection by a sensor 24 occurs when a portion of a user's body such as a hand or finger comes within sensitivity range directly over that sensor 24. By locating multiple sensors 24 on the underside of faceplate assembly 58, a sensor array is created to resemble the array of mechanical switches. Sensors 24 can be configured to have many different kinds of shapes such as raised surfaces or recessed contours to prevent accidental activation. Adding faceplate assembly 58 to the reversing control of a power window reduces complexity and cost associated with mechanical switches and associated wiring. The power window control for up/down can be incorporated into faceplate assembly 58 or the control can be remote if required due to vehicle design and packaging.

Referring briefly back to FIG. 2, a second sensor 24a placed on the external surface of the hatch (i.e., lift gate 12) of the vehicle can be used as an interface to operate the hatch. Additionally, a single controller can be used to interface with both anti-entrapment sensor 24 and hatch operating sensor 24a.

Referring back to FIGS. 5 and 6, faceplate assembly 58 includes a faceplate 60 made of electrically non-conductive material. Faceplate 60 provides support for multiple sensors 24 mounted to its underside (i.e., underside faceplate surface 63) and allows for object detection through its topside (i.e., topside faceplate surface 62). Underside faceplate surface 63 is relatively smooth to permit close mounting of sensors 24 to faceplate 60. However, degrees of roughness can also be configured to function effectively. Topside faceplate surface 62 can have any number of physical features 64 or graphical markings which are respectively associated (e.g., aligned) with sensors 24 in order to assist a user in locating the position of each sensor 24 and identifying the function assigned therewith.

Each sensor 24 is formed as a thin electrically conductive pad mounted firmly to underside faceplate surface 63. Each sensor 24 in this configuration is pliable and can therefore be formed to the contours of the surface of faceplate 60 to which the sensor is attached. An adhesive may be applied between sensors 24 and the surface of faceplate 60 for positioning and support as well as minimizing air gaps between sensors 24 and the faceplate surface. Alternatively, sensors 24 can be molded into faceplate 60 thereby eliminating the need for adhesive or other mechanical attachment. Another alternate is each sensor 24 being arranged as a member mounted directly on a printed circuit board (PCB) 66 (i.e., a controller) and extending up toward, and possibly contacting, underside faceplate surface 63. With this arrangement, sensors 24 can be in direct physical and electrical contact with PCB 66 or in indirect contact with PCB 66 through the use of a joining conductor.

Each sensor 24 can be constructed of an electrically conductive material such as foam, metal, conductive plastic, or a non-conductive element with a conductive coating applied thereon. Materials used to construct sensors 24 should be of a compressible nature to account for tolerance stack-ups that are a normal part of any assembly having more than one component. Sensor compressibility ensures that contact is maintained between faceplate 60 and PCB 66. In the event that faceplate 60 is to be backlit, the use of a light pipe with conductive coating applied could be configured as a sensor 24.

Sensors 24 can be constructed from materials having low electrical resistance such as common metals like copper or aluminum. Other materials exhibiting low electrical resistance such as conductive plastics, epoxies, paints, inks, or metallic coatings can be used. Sensors 24 can be preformed to resemble decals, emblems, stickers, tags, and the like. Sensors 24 can be applied onto surfaces as coatings or etched from plated surfaces. If materials are delicate, then a non-conductive backing 68 such as polyester film, fiberglass, paper, rubber, or the like can support and protect sensors 24 during installation. In applications where multiple sensing areas are required, backing 68 can assist in locating and anchoring sensors 24 to faceplate 60.

Figure 7A:
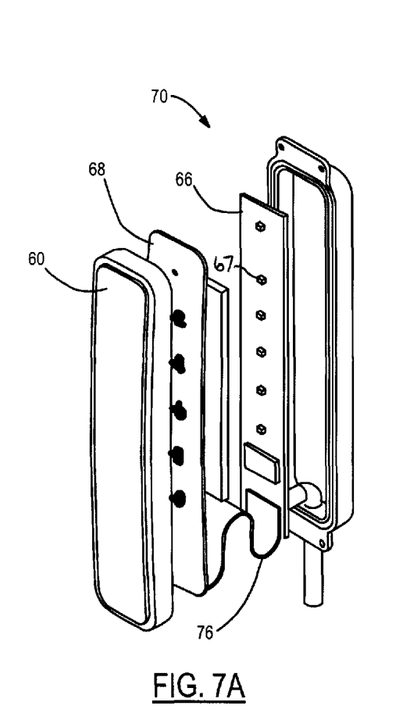
FIGS. 7A through 7D illustrate various views of a vehicle keyless entry assembly in accordance with an embodiment of the present invention.
Figure 7B:
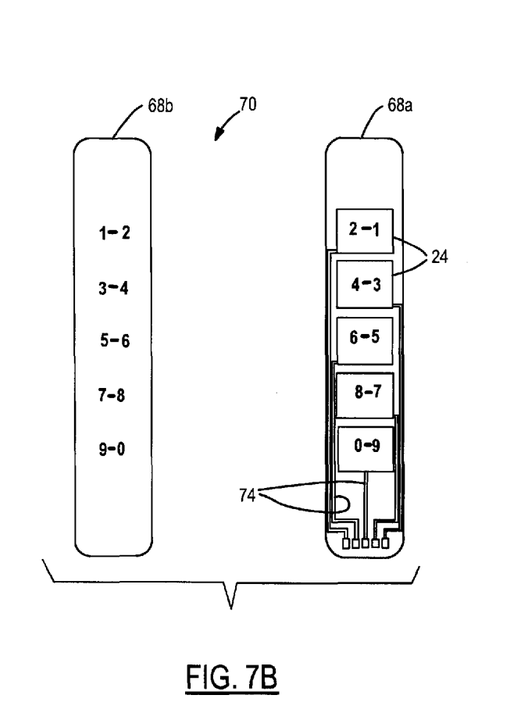
Figure 7C:
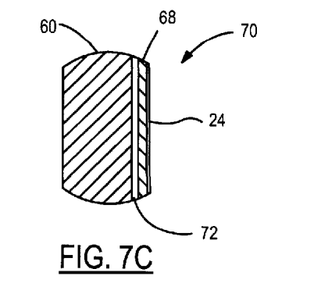
Figure 7D:
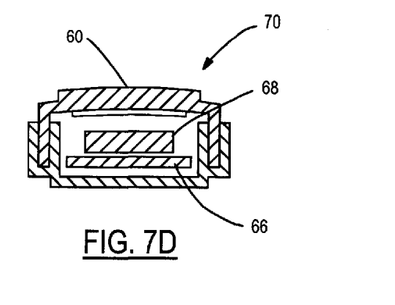

With reference to FIG. 6, backing 68 is a flexible circuit having copper pads which make up the touch pads of sensors 24 (i.e., each sensor 24 includes a copper pad). Backing 68 includes separated copper wires electrically connected to respective sensors 24 (shown in FIG. 7B). Backing 68 makes an electrical connection to PCB 66 such that each sensor 24 is electrically connected to the signal conditioning electronics of PCB 66. In an alternate configuration, backing 68 and PCB 66 are combined into a single circuit board containing both the touch pads of sensors 24 and the signal conditioning electronics.

In order to activate a sensor 24, a user applies a finger to the associated marking 64 on the surface of faceplate 60. Electronic signal conditioning circuitry of PCB 66 which is interfaced to sensor 24 then processes the input signal from sensor 24 and completes circuit connections to activate the commanded function. The action is similar to pressing a mechanical switch to complete an electrical circuit.

Placement of sensors 24 behind a non-conductive barrier such as faceplate 60 creates a protective barrier between users and sensors 24 and shields sensors 24 against environmental contaminants. Sensors 24 can be applied to the backside of virtually any non-conductive barrier and preferably are flexible enough to conform to complex geometries where operator switch functions are needed. Sensors 24 can be contoured and configured from more rigid materials if desired. Examples of switch locations in a vehicle are door panels, armrests, dashboards, center consoles, overhead consoles, internal trim panels, exterior door components, and the like. Sensors 24 can be arranged individually or grouped as keypad arrays. Sensors 24 can be arranged into patterns of sequential sensing elements which are either electrically discrete or interconnected to create ergonomically appealing interfaces.

Referring now to FIGS. 7A through 7D, with continual reference to FIGS. 5 and 6, various views of a vehicle keyless entry assembly 70 in accordance with an embodiment of the present invention are shown. Vehicle keyless entry assembly 70 represents an example of an automotive application incorporating sensors 24. Sensors 24 of vehicle keyless entry assembly 70 function as touch pads to activate a vehicle keyless entry. In addition to sensors 24, vehicle keyless entry assembly 70 includes a faceplate 60, a backing 68, and a PCB 66 (i.e., a controller). Sensors 24 with backing 68 are configured as a flexible circuit which uses individual conductive coatings for the touch pads of sensors 24. Backing 68 makes respective electrical connections between sensors 24 and the signal conditioning electronics on PCB 66.

Vehicle keyless entry assembly 70 represents an example of a product requiring backlighting. As such, sensors 24 have to be capable of passing light. Accordingly, faceplate 60 in this configuration is a molded transparent or translucent non-conductive material such as GE Plastics Lexan® 141 grade polycarbonate. Further, PCB 66 has light sources 67 for illumination. Light sources 67 are positioned on respective portions of PCB 66 to be adjacent to corresponding ones of sensors 24. Other resins or materials meeting the application requirements including acceptable light transmittance characteristics can also be used for faceplate 60. Sensors 24 are attached to the underside 68a of backing 68. In turn, the topside 68b of backing 68 is attached to the interior surface of faceplate 60 using adhesive 72. The topside 68b of backing 68 has graphic characters 64 that locate the position of associated sensors 24 and identify the function assigned therewith. Either the underside 68a or the topside 68b of backing 68 has individual traces 74 for making an electrical connection between sensors 24 and PCB 66. Connection between backing 68 and PCB 66 is connected by a flat cable 76 which contains traces 74. This interconnect can be accomplished using other carriers such as individual wires, header style connectors, and the like. In any of the configurations, sensors 24 can be applied directly to the surface which is to be touched for activation. However, sensors 24 are on the backside of the touch surface for protection and wear resistance.

Each sensor 24 of vehicle keyless entry assembly 70 may be made from Indium Tin Oxide (ITO) which is optically transparent and electrically conductive with an electrical resistance measuring sixty ohms/sq. Other electrically conductive materials such as foam, elastomer, plastic, or a nonconductive structure with a conductive coating applied thereon can be used to produce a sensor 24 having transparent or translucent properties and being electrically conductive. Conductive materials that are opaque such as metal, plastic, foam, elastomer, carbon inks, or other coatings can be hollowed to pass light where desired while the remaining perimeter of material acts as sensor 24.

An optically transparent and an electrically conductive sensor 24 made from ITO may create a color shift as light travels through the sensor and through the faceplate to which the sensor is attached. This color shift is a result of the optical quality and reflection of the optical distance between the front ITO surface of the sensor and the rear ITO surface of the sensor. In order to eliminate the light transmission errors between the different ITO layers, a transparent coating is applied on the rear ITO surface to initially bend the light which thereby eliminates the color differential seen on the front surface of the sensor between the front and rear ITO surfaces of the sensor. Additionally, an acrylic coating may be applied on the sensor to provide a layer of protection and durability for exposed ITO.

Turning back to FIG. 2, with continual reference to the other figures, as described above, a second sensor 24a placed on the external surface of a vehicle opening such as a hatch (i.e., lift gate 12) can be used as an interface to operate the vehicle opening. In accordance with an embodiment of the present invention, a keyless entry assembly includes a sensor like any of sensors 24 described herein which is to be placed on the external surface of a vehicle opening and is to be used as an interface to operate (i.e., open and close; unlock and lock) the vehicle opening. As an alternative to being a hatch, the vehicle opening may be a door, a trunk lid, or any other opening of a vehicle and may be of a metal construction. The discussion below will assume that the vehicle opening is a trunk lid and that this keyless entry assembly includes a sensor 24 which is placed on the external side of the trunk lid and arranged behind a non-conductive barrier like faceplate 60.

This keyless entry assembly further includes a controller in addition to sensor 24. The controller is operable to unlock the trunk lid. The controller is in communication with sensor 24 to monitor the capacitance of sensor 24 in order to determine whether an object (including a human user) is touching sensor 24 or whether an electrically conductive object (such as the user) is in proximity to sensor 24. If the controller determines that a user is touching or is in proximity to sensor 24, then the controller deduces that the user is at least in proximity to the trunk lid. Upon deducing that a user is at least in proximity to the trunk lid, the controller controls the trunk lid accordingly. For instance, while the trunk lid is closed and a user touches or comes into proximity to the trunk lid, the controller unlocks the trunk lid. In turn, the user can open the trunk lid (or the trunk lid can be opened automatically) to access the trunk.

As such, this keyless entry assembly can be realized by touch or touchless activation for releasing the trunk lid. An example of touch activation is a user touching sensor 24. An example of touchless activation is a user moving into proximity to sensor 24. As will be described in greater detail below with reference to FIGS. 8A and 8B, another example of touchless activation is a sequence of events taking place such as a user approaching sensor 24 and then stepping away in a certain amount of time.

In either touch or touchless activation, this keyless entry assembly may include a mechanism for detecting the authorization of the user to activate the trunk lid. To this end, the controller is operable for key fob querying and the user is to possess a key fob in order for the controller to determine the authorization of the user in a manner known by those of ordinary skill in the art. That is, the user is to be in at least proximity to the trunk lid and be in possession of an authorized key fob (i.e., the user has to have proper identification) before touch or touchless activation is provided.

For instance, in operation, a user having a key fob approaches a trunk lid on which sensor 24 is placed. The user then touches or comes into proximity to sensor 24. In turn, the controller determines that an object is touching or is in proximity to the trunk lid based on the resulting capacitance of sensor 24. The controller then transmits a key fob query to which the key fob responds. If the response is what the controller expected (i.e., the key fob is an authorized key fob), then the controller unlocks the trunk lid for the user to gain access to the trunk. On the other hand, if there is no response or if the response is not what the controller expected (i.e., the key fob is an unauthorized key fob), then the controller maintains locking of the trunk lid.

Figure 8A:
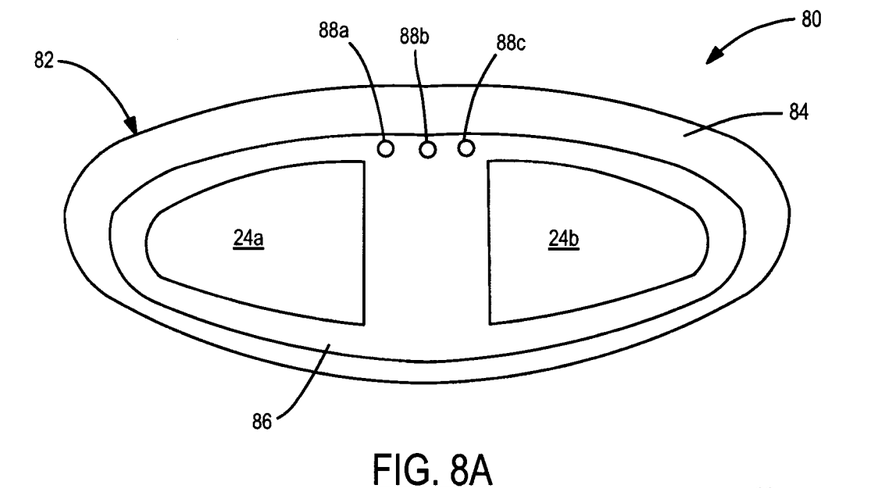
FIGS. 8A and 8B illustrate various views of a vehicle keyless entry assembly in accordance with an embodiment of the present invention.
Figure 8B:
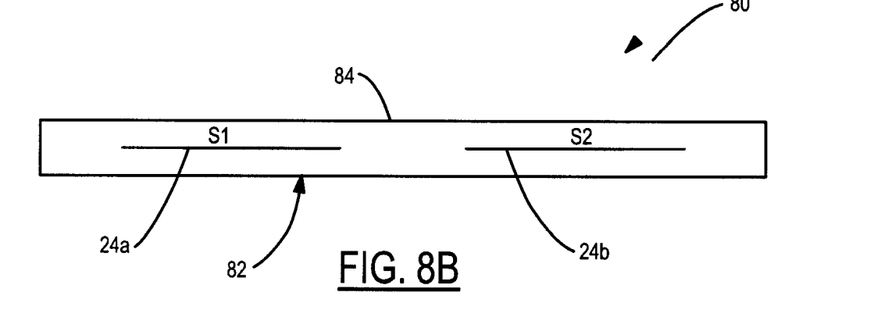

Another feature of this keyless entry assembly, described in greater detail below with reference to FIGS. 8A and 8B, is that sensor 24 may be in the form of an emblem, decal, logo, or the like (e.g., "emblem") in a manner as described herein. Such an emblem (i.e., sensor 24) may represent or identify the vehicle to which sensor 24 is associated. As such, emblem 24 may have different structures, forms, and characteristics depending on manufacturer and model of the vehicle.

Further, sensor 24 of this keyless entry assembly may be capable of passing light in a manner as described herein. Accordingly, this keyless entry assembly may further include a light source, such as any of light sources 67, which is associated with sensor 24. In this event, the controller is operable for controlling the light source in order to illuminate sensor 24 (i.e., illuminate the emblem).

With the above description of this keyless entry assembly in mind, FIGS. 8A and 8B illustrate various views of such a keyless entry assembly 80 in accordance with an embodiment of the present invention.

Keyless entry assembly 80 includes a sensor assembly 82 and a controller (not shown). The controller is in communication with sensor assembly 82 and is operable for controlling vehicle functions such as locking and unlocking a vehicle opening (e.g., a trunk lid of a vehicle). FIG. 8A is a view looking at sensor assembly 82 while sensor assembly 82 is placed on the external surface of the trunk lid. FIG. 8B is a view looking through a cross-section of sensor assembly 82. Sensor assembly 82 includes two sensors (i.e., first sensor 24a and second sensor 24b). First sensor 24a is labeled in FIG. 8B as "S1" and second sensor 24b is labeled in FIG. 8B as "S2". Sensors 24a, 24b are respectively located at different portions of sensor assembly 82. For instance, as shown in FIGS. 8A and 8B, first sensor 24a is at a left-hand side of sensor assembly 82 and second sensor 24b is at a right-hand side of sensor assembly 82.

Sensors 24a, 24b are electrically connected to or associated with a PCB in a manner as described herein. As such, sensors 24a, 24b are not electrically connected to one another. First sensor 24a activates when an object is in proximity to first sensor 24a and second sensor 24b activates when an object is in proximity to second sensor 24b. Similarly, only first sensor 24a activates when an object is in proximity to first sensor 24a and not to second sensor 24b. Likewise, only second sensor 24b activates when an object is in proximity to second sensor 24b and not to first sensor 24a. The activation of a sensor like sensors 24a, 24b depends on the capacitance of the sensor as a result of an object coming into at least proximity with the sensor. For instance, when an object is in proximity to both sensors 24a, 24b and is closer to first sensor 24a than to second sensor 24b, then first sensor 24a will have a stronger activation than second sensor 24b.

Sensor assembly 82 further includes a non-conductive barrier 84 like faceplate 60. Sensors 24a, 24b are mounted to the underside of faceplate 84. Faceplate 84 allows for object detection through its topside. Sensor assembly 82 further includes an overlay 86 positioned over faceplate 84. Overlay 86 is in the shape of an emblem or logo representing the vehicle. In this example, overlay 86 includes two cut-out portions at which sensors 24a, 24b are respectively located. As such, sensors 24a, 24b are patterned to conform to the emblem arrangement of overlay 86.

Keyless entry assembly 80 is an example of the use of sensors (i.e., sensor assembly 82) in conjunction with a controller for operating a trunk lid when a user is in proximity to or is touching sensor assembly 82. As described herein, the operation of the trunk lid may further depend on the authenticity of the user (i.e., whether the user is in possession of an authorized key fob). In the manner described above, sensor assembly 82 can be used to realize either touch or touchless activation for releasing the trunk lid. In terms of touchless activation, sensor assembly 82 represents an example of a handsfree virtual proximity switch.

A particular application of sensor assembly 82 realizing touchless activation involves a sequence of user events taking place relative to sensor assembly 82 in order to control operation of the trunk lid. For instance, the controller of keyless entry assembly 80 may be configured such that a user is required to approach sensor assembly 82 and then step back from sensor assembly 82 in a certain amount of time in order for the controller to unlock the trunk lid. Such a sequence of user events are effectively user body gestures. As such, an expected sequence of user body gestures effectively represents a virtual code for unlocking the trunk lid. That is, the controller controls unlocks the trunk lid in response to a user performing an expected sequence of body gestures in relation to sensor assembly 82. The user may or may not be required to have an authorized key fob depending on whether possession of an authorized key fob is required to unlock the trunk lid.

A more elaborate example of an expected sequence of user body gestures includes the user starting in proximity to sensor assembly 82, then moving backward, then moving left, then moving right, etc. For understanding, another example of an expected sequence of includes the user starting in proximity to sensor assembly 82, then moving away, then moving close, etc. The steps of either sequence may be required to occur within respective time periods. As can be seen, different expected sequences of user body gestures effectively represent different virtual codes for controlling the trunk lid.

Keyless entry assembly 80 provides the user the opportunity to 'personalize' sensor assembly 82 in order to program the controller with the expected sequence of user body gestures that are to be required to control the trunk lid. Personalizing sensor assembly 82 with an expected sequence of user body gestures effectively provides a virtual code to the controller which is to be subsequently entered by the user (by subsequently performing the expected sequence of user body gestures) for the controller to unlock the trunk lid.

The requirement of a sequence of user body gestures, i.e., user body gestures in a certain pattern in a certain amount of time, to take place in order to control operation of the trunk lid is enabled as sensors 24a, 24b activate differently from one another as a function of the proximity of the user to that particular sensor. Again, each sensor 24a, 24b activates when a user is in proximity to that sensor and each sensor 24a, 24b is not activated when a user in not in proximity to that sensor. In the former case, sensors 24a, 24b activate when a user is in proximity to sensors 24a, 24b (which happens when a user steps into proximity of both sensors 24a, 24b). In the latter case, sensors 24a, 24b are not activated when the user is out of proximity to sensors 24a, 24b (which happens when a user steps back far enough away from sensors 24a, 24b).

As further noted above, the amount of activation of a sensor such as sensors 24a, 24b depends on the proximity of a user to the sensor. For instance, first sensor 24a has a stronger activation than second sensor 24b when the user is in closer proximity to first sensor 24a than to second sensor 24b. As such, in this event, the controller determines that the user is closer to first sensor 24a than to second sensor 24b. That is, the controller determines that the user has stepped to the left after the user initially was initially in proximity to sensor assembly 82. Likewise, second sensor 24b has a stronger activation than first sensor 24a when the user is in closer proximity to second sensor 24b than to first sensor 24a. As such, in this event, the controller determines that the user is closer to second sensor 24b than to first sensor 24a. That is, the controller determines that the user has stepped to the right after the user initially was in proximity to sensor assembly 82.

In order to improve this particular application of touchless activation which involves an expected sequence of user body gestures to take place, sensor assembly 82 further includes a plurality of light sources 88 such as light-emitting diodes (LEDs). For instance, as shown in FIG. 8A, sensor assembly 82 includes a first LED 88a, a second LED 88b, and a third LED 88c. LEDs 88 are electrically connected to the PCB to which sensors 24a, 24b are electrically connected. LEDs 88 are mounted to the underside of faceplate 84 where overlay 86 is absent or, alternatively, LEDs 88 are mounted to the underside of faceplate 84 where overlay 86 is present (as shown in FIG. 8A). In either case, faceplate 84 is clear such that light from LEDs 88 can pass through faceplate 84. In the latter case, overlay 86 has cutouts dimensioned to the size of LEDs 88 and LEDs 88 are respectively positioned adjacent to these cutouts such that light from LEDs 88 can pass through faceplate 84 and overlay 86.

The controller is configured to control LEDs 88 to light on or off depending on activation of sensors 24a, 24b. In general, the controller controls LEDs 88 such that: LEDs 88a, 88b, 88c light on when both sensors 24a, 24b are activated; LEDs 88a, 88b, 88c light off when both sensors 24a, 24b are not activated; first LED 88a lights on when first sensor 24a is activated and lights off when first sensor 24a is not activated; and third LED 88c lights on when second sensor 24b is activated and lights off when second sensor 24b is not activated. More specifically, the controller controls LEDs such that: LEDs 88a, 88b, 88c light on when a user is in proximity to both sensors 24a, 24b (which occurs when the user steps close to sensor assembly 82) 24b); LEDs 88a, 88b, 88c light off when the user is out of proximity to both sensors 24a, 24b (which occurs when the user steps far enough back away from sensor assembly 82); first LED 88a lights on and second and third LEDs 88b, 88c light off when the user is in proximity to first sensor 24a and is no closer than tangential proximity to second sensor 24b (which occurs when the user steps to the left while in proximity to sensor assembly 82); and third LED 88c lights on and first and second LEDs 88a, 88b light off when the user is in proximity to second sensor 24b and is no closer than tangential proximity to first sensor 24a (which occurs when the user steps to the right while in proximity to sensor assembly 82).

Accordingly, the user can use the lighting of LEDs 88a, 88b, 88c as feedback when performing a sequence of user body gestures relative to sensor assembly 82 in order to either program (personalize) sensor assembly 82 with the sequence of user body gestures or to unlock the trunk lid by performing the sequence of user body gestures.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:
1. A keyless entry assembly comprising:
a vehicle opening of a metal construction movable between a locked position and an unlocked position;
a sensor assembly mounted to an exterior surface of the vehicle opening, wherein the sensor assembly includes an electrically non-conductive barrier, a plurality of sensors mounted to an underside of the barrier that capacitively couples to an electrically conductive object proximal to a topside of the barrier for object detection while the sensors are driven with an electrical charge such that capacitance of the sensors change due to at least one of the sensors capacitively coupling with the object, an overlay positioned over the barrier, wherein the overlay itself is preformed in the shape of an emblem identifying a vehicle to be associated with the vehicle opening and includes a plurality of cut-out portions located at different portions at which the sensors of the sensor assembly are respectively located and not electrically connected to one another, and a plurality of light sources mounted to the underside of the barrier wherein the barrier is clear such that light from the light sources can pass through the barrier and the overlay has a plurality of cutouts at which the light sources are respectively located such that light from the light sources can pass through the barrier and the overlay;
a controller operable for driving the sensors with the electrical charge and measuring the capacitance of the sensors to determine whether an electrically conductive object is proximal to the at least one of the sensors, the controller further operable for controlling the vehicle opening to move the vehicle opening from one of the positions to the other of the positions upon determining that an electrically conductive object is proximal to the at least one of the sensors, wherein the controller is configured to control the light sources on or off depending on activation of the least one of the sensors;
wherein the sensors are flexible such that the sensors displace toward the vehicle opening upon an object touching the at least one of the sensors in a direction toward the vehicle opening; and
wherein the sensors are capacitively coupled to the vehicle opening while the sensors are driven with the electrical charge such that the capacitance of the sensors change due to the at least one of the sensors being displaced toward the vehicle opening upon an object touching the at least one of the sensors.
2. The keyless entry assembly of claim 1 wherein:
the controller is further operable for key fob querying, wherein the controller controls the vehicle opening to move the vehicle opening from one of the positions to the other of the positions upon determining that an electrically conductive object is proximal to the at least one of the sensors and that an authorized key fob is in range of the controller.
3. The keyless entry assembly of claim 1 wherein:
the vehicle opening is one of a vehicle door, a vehicle hatch, and a vehicle trunk lid.
4. The keyless entry assembly of claim 1 wherein:
the one of the positions is the locked position and the other of the positions is the unlocked position.

5. The keyless entry assembly of claim 1 wherein:
the one of the positions is the unlocked position and the other of the positions is the locked position.

6. The keyless entry assembly of claim 1 wherein:
the controller is further operable for measuring the capacitance of the sensors to determine whether an object is touching the at least one of the sensors and is further operable for controlling the vehicle opening to move the vehicle opening from one of the positions to the other of the positions upon determining that an object is touching the at least one of the sensors.

7. The keyless entry assembly of claim 1 further comprising:
an electrically non-conductive compressible spacer, wherein the spacer is between the sensors and the exterior surface of the vehicle opening;
wherein the spacer compresses toward the vehicle opening in response to a given object touching the at least one of the sensors such that the at least one of the sensors displaces toward the vehicle opening, wherein the sensors are capacitively coupled to the vehicle opening while the sensors are driven with the electrical charge such that the capacitance of the at least one of the sensors changes due to the at least one of the sensors being displaced toward the vehicle opening upon the object touching the at least one of the sensors.

8. The keyless entry assembly of claim 7 wherein:
the controller is operable with the vehicle opening to move the vehicle opening from one of the positions to the other of the positions as a function of either an electrically conductive object being proximal to the at least one of the sensors or the given object touching the at least one of the sensors.

9. A keyless entry assembly comprising:
a sensor assembly mountable to an exterior surface of a vehicle opening movable between a locked position and an unlocked position, wherein the sensor assembly includes an electrically non-conductive spacer, a plurality of sensors mounted to the spacer that capacitively couples to an electrically conductive object proximal to the spacer for object detection while the sensors are driven with an electrical charge such that capacitance of the sensors change due to the at least one of the sensors capacitively coupling with the object, an overlay positioned over the spacer, wherein the overlay itself is in the shape of an emblem identifying a vehicle to be associated with the vehicle opening and includes a plurality of cut-out portions located at different portions at which the sensors of the sensor assembly are respectively located and not electrically connected to one another, and a plurality of light sources mounted to the underside of the spacer wherein the spacer is clear such that light from the light sources can pass through the spacer and the overlay has a plurality of cutouts at which the light sources are respectively located such that light from the light sources can pass through the spacer and the overlay;
a controller operable for driving the sensors with the electrical charge and measuring the capacitance of the sensors to determine whether an electrically conductive object is proximal to the at least one of the sensors, the controller further operable for controlling the vehicle opening to move the vehicle opening from one of the positions to the other of the positions upon determining that an electrically conductive object is proximal to the at least one of the sensors, wherein the controller is configured to control the light sources on or off depending on activation of the sensors;
wherein the sensors are flexible such that the sensors displaces upon an object touching the at least one of the sensors; and
wherein the spacer compresses in response to a given object touching the at least one of the sensors such that the at least one of the sensors displaces, wherein the capacitance of the at least one of the sensors changes due to the at least one of the sensors being displaced toward the vehicle opening upon the object touching the at least one of the sensors.

10. The keyless entry assembly of claim 9 wherein:
the controller is further operable for key fob querying, wherein the controller controls the vehicle opening to move the vehicle opening from one of the positions to the other of the positions upon determining that an electrically conductive object is proximal to the at least one of the sensors and that an authorized key fob is in range of the controller.

11. The keyless entry assembly of claim 9 wherein:
the controller is further operable for illuminating the at least one of the sensors and the area of the sensor assembly around the sensors.

12. The keyless entry assembly of claim 9 wherein:
the vehicle opening is one of a vehicle door, a vehicle hatch, and a vehicle trunk lid.

13. The keyless entry assembly of claim 9 wherein:
the one of the positions is the locked position and the other of the positions is the unlocked position.

14. The keyless entry assembly of claim 9 wherein:
the one of the positions is the unlocked position and the other of the positions is the locked position.

15. The keyless entry assembly of claim 9 wherein:
the controller is further operable for measuring the capacitance of the sensors to determine whether an object is touching the at least one of the sensors and is further operable for controlling the vehicle opening to move the vehicle opening from one of the positions to the other of the positions upon determining that an object is touching the at least one of the sensors.

16. The keyless entry assembly of claim 9 wherein:
the controller is operable with the vehicle opening to move the vehicle opening from one of the positions to the other of the positions as a function of either an electrically conductive object being proximal to the at least one of the sensors or the given object touching the at least one of the sensors.

17. A keyless entry assembly comprising:
a sensor assembly mountable to an exterior surface of a vehicle opening movable between a locked position and an unlocked position, wherein the sensor assembly includes an electrically non-conductive barrier and a first sensor and a second sensor that each capacitively couples to an electrically conductive object proximal to one of the first sensor and the second sensor while the first sensor and the second sensor are driven with an electrical charge such that capacitance of the one of the first sensor and the second sensor changes due to the one of the first sensor and the second sensor capacitively coupling with the object, wherein the overlay itself is in the shape of an emblem identifying a vehicle associated with the vehicle opening and includes a first cut-out portion and a second cut-out portion located at different portions of the overlay at which the first sensor and the second sensor of the sensor assembly are respectively located and not electrically connected to one another, and a plurality of light sources mounted to the underside of the barrier wherein the barrier is clear such that light from the light sources can pass through the barrier and the overlay has a plurality of cutouts at which the light sources are respectively located such that light from the light sources can pass through the barrier and the overlay;

a printed circuit board connected to the first sensor and the second sensor;

the light sources being electrically connected to the printed circuit board;

a controller operable for driving the first sensor and the second sensor with the electrical charge and for controlling the light sources on or off depending on the activation of the first sensor and the second sensor, the controller measuring the capacitance of the first sensor and the second sensor to determine whether an electrically conductive object is proximal to the one of the first sensor and the second sensor, wherein the controller is further operable for controlling the vehicle opening to move the vehicle opening from one of the positions to the other of the positions upon determining that an electrically conductive object is proximal to the one of the first sensor and the second sensor and is moving in proximity relative to the one of the first sensor and the second sensor without touching the one of the first sensor and the second sensor in accordance with an expected sequence of movements.

18. The assembly of claim 17 wherein an electrically conductive object is a human user, wherein:
the controller is further operable for controlling the vehicle opening to move the vehicle opening from one of the positions to the other of the positions upon determining that the user is proximal to the one of the first sensor and the second sensor and is moving relative to the one of the first sensor and the second sensor in accordance with an expected sequence of movements;
wherein the expected sequence of movements are an expected sequence of user body gestures.

19. A keyless entry assembly comprising:
a vehicle opening of a metal construction movable between a locked position and an unlocked position;
a sensor assembly mounted to an exterior surface of the vehicle opening, wherein the sensor assembly includes an electrically non-conductive barrier and a plurality of sensors mounted to an underside of the barrier and not electrically connected to one another, each of the sensors capacitively couples to an electrically conductive object proximal to a topside of the barrier for object detection while each of the sensors is driven with an electrical charge such that capacitance of one of the sensors changes due to the one of the sensors capacitively coupling with the object, wherein the sensor assembly itself is preformed in the shape of an emblem identifying a vehicle to be associated with the vehicle opening and the sensors are located at different portions of the sensor assembly and not electrically connected to one another and an overlay is positioned over the barrier, the overlay being in the shape of the emblem, wherein the overlay includes a plurality of cut-out portions for the sensors such that the sensors are patterned to conform to the emblem arrangement of the overlay, and a plurality of light sources mounted to the underside of the barrier wherein the barrier is clear such that light from the light sources can pass through the barrier and the overlay has a plurality of cutouts at which and the light sources are respectively located such that light from the light sources can pass through the barrier and overlay;

a controller operable for driving each of the sensors with the electrical charge and measuring the capacitance of each of the sensors to determine whether an electrically conductive object is proximal to the one of the sensors, the controller further operable for controlling the vehicle opening to move the vehicle opening from one of the positions to the other of the positions upon determining that an electrically conductive object is proximal to the one of the sensors, wherein the controller is configured to control the light sources on or off depending on activation of the sensors;

wherein each of the sensors is flexible such that each of the sensors displace toward the vehicle opening upon an object touching the one of the sensors in a direction toward the vehicle opening;

wherein the one of the sensors is capacitively coupled to the vehicle opening while the sensors are driven with the electrical charge such that the capacitance of the one of the sensors changes due to the one of the sensors being displaced toward the vehicle opening upon an object touching the one of the sensors.

20. A keyless entry assembly as set forth in claim 19 including a printed circuit board connected to the sensors.

21. A keyless entry assembly as set forth in claim 20 wherein the light sources are electrically connected to the printed circuit board.

22. A keyless entry assembly as set forth in claim 21 wherein the light sources are light emitting diodes mounted to the underside of the barrier.

23. A keyless entry assembly comprising:
a vehicle opening of a metal construction movable between a locked position and an unlocked position;
a sensor assembly mounted to an exterior surface of the vehicle opening, wherein the sensor assembly includes an electrically non-conductive barrier and a first sensor and a second sensor mounted to an underside of the barrier and not electrically connected to one another, each of the first sensor and the second sensor capacitively couples to an electrically conductive object proximal to a topside of the barrier for object detection while each of the first sensor and the second sensor is driven with an electrical charge such that capacitance of each of the first sensor and the second sensor changes due to each of the first sensor and the second sensor capacitively coupling with the object, an overlay positioned over the barrier, the overlay being in the shape of an emblem identifying a vehicle to be associated with the vehicle opening and the first sensor and the second sensor are located at different portions of the sensor assembly and not electrically connected to one another, wherein the overlay includes first and second cut-out portions for the first sensor and the second sensor such that the first sensor and the second sensor are patterned to conform to the emblem arrangement of the overlay, and a plurality of light sources mounted to the underside of the barrier wherein the barrier is clear such that light from the light sources can pass through the barrier and the overlay has a plurality of cutouts at which the light sources are respectively located such that light from the light sources can pass through the barrier and overlay;

a printed circuit board connected to the first sensor and the second sensor; and a controller for driving the first sensor and the second sensor with the electrical charge and for controlling the light sources on or off depending on the activation of the sensors, the controller being operable for driving each of the first sensor and the second sensor with the electrical charge and measuring the capacitance of each of the first sensor and the second sensor to determine whether an electrically conductive object is proximal to one of the first sensor and the second sensor, the controller further operable for controlling the vehicle opening to move the vehicle opening from one of the positions to the other of the positions upon determining that an electrically conductive object is proximal to the one of the first sensor and the second sensor.

\* \* \* \* \*

UNITED STATES PATENT AND TRADEMARK OFFICE
CERTIFICATE OF CORRECTION

PATENT NO. : 10,017,977 B2
APPLICATION NO. : 12/784010
DATED : July 10, 2018
INVENTOR(S) : Todd R. Newman et al.

Page 1 of 1

It is certified that error appears in the above-identified patent and that said Letters Patent is hereby corrected as shown below:

In the Claims

At Column 16, Line number 4, delete "displaces" and add --displace--

At Column 17, Line number 49, delete "couples" and add --coupled--

Signed and Sealed this
Eighth Day of January, 2019

Andrei Iancu
*Director of the United States Patent and Trademark Office*